J. C. ADAM.
SNOW SHOVEL.
APPLICATION FILED FEB. 14, 1911.

1,000,875.

Patented Aug. 15, 1911.

WITNESSES.

INVENTOR.
J. C. Adam.

UNITED STATES PATENT OFFICE.

JACOB CHRISTOPHER ADAM, OF BUFFALO, NEW YORK.

SNOW-SHOVEL.

1,000,875.

Specification of Letters Patent.     Patented Aug. 15, 1911.

Application filed February 14, 1911. Serial No. 608,592.

*To all whom it may concern:*

Be it known that I, JACOB CHRISTOPHER ADAM, of the city of Buffalo, in the county of Erie, in the State of New York, one of the United States of America, have invented certain new and useful Improvements in Snow-Shovels, of which the following is the specification.

My invention relates to improvements in snow shovels and the object of the invention is to devise a shovel which will readily remove ice and frozen snow from a side walk, and it consists essentially of a blade provided at its lower end with a portion turned slightly upwardly at an obtuse angle to the main portion of the blade such upturned portion being provided with a sharpened lower edge, a supplemental portion preferably stamped out of the main portion and bent downwardly in a forwardly extending curve the forward edge thereof being provided with a suitable serrated or toothed edge as hereinafter more particularly described by the following specification.

Figure 1:
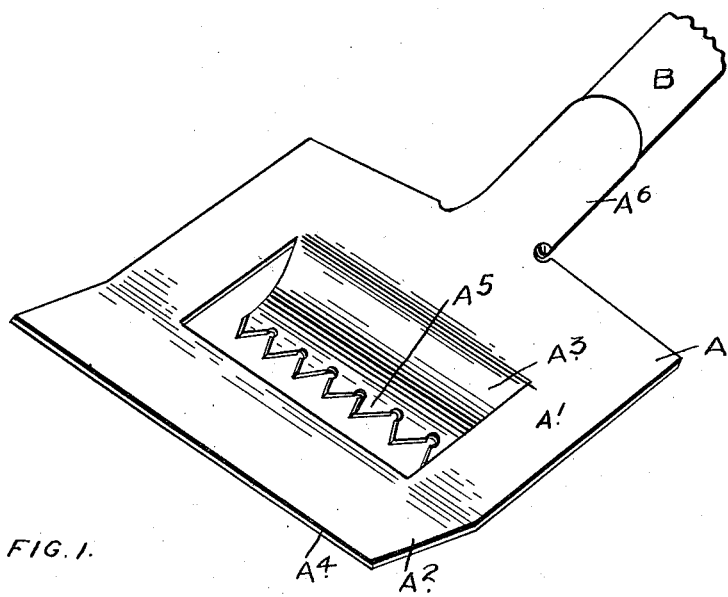
Figure 2:
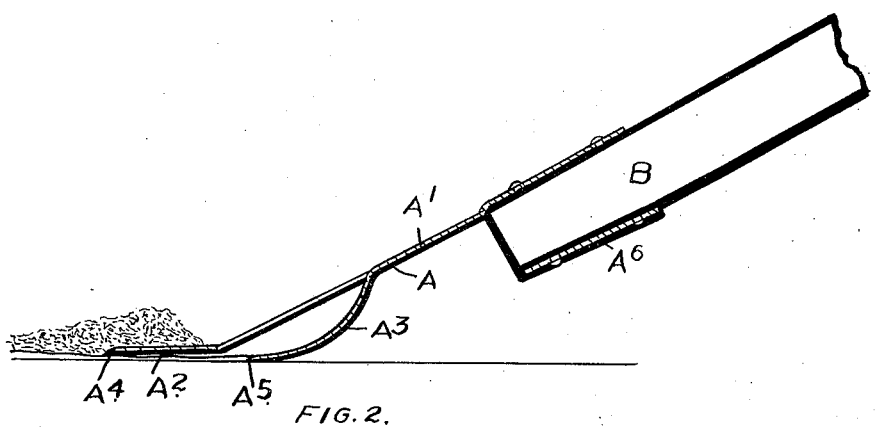

Figure 1, is a general perspective view of my shovel and a portion of the handle thereof. Fig. 2, is a longitudinal section through Fig. 1.

In the drawings like letters of reference indicate corresponding parts in each figure.

A is a blade of the shovel comprising the main portion $A'$ and a supplemental portion $A^2$ turned slightly upwardly at an obtuse angle to main portion A. The lower edge of the portion $A^2$ is suitably sharpened.

$A^3$ is a supplemental portion stamped out of or suitably secured beneath the main portion $A'$ of the blade. The portion $A^3$ extends beneath the main portion $A'$ of the blade. The portion $A^3$ extends downwardly and forwardly in a curved direction as shown particularly in Fig. 2 of the drawings, the forward edge being located slightly below the level of the edge $A^4$ of the portion $A^2$ of the main blade. The forward edge of the portion $A^3$ is provided with suitable serrations or teeth $A^5$.

$A^6$ is a socket which is preferably formed up out of a portion extending from the main portion of the blade and into which extends a suitable handle B.

In using my shovel the portion $A^2$ serves to lift on to the main portion of the blade partially frozen snow. Simultaneously the serration or teeth of the portion $A^5$ engage the ice or frozen snow beneath the main body of the snow and serve to pry the ice from the side walk or other place from which it is desired to remove the same.

From this description it will be seen that I have devised a very simple device for removing from a walk the ice which often lies beneath the snow.

What I claim as my invention is:

A snow shovel comprising a main blade, the lower portion of which is bent at an obtuse angle and having a center opening having a straight front edge parallel with the front edge of the blade in a line with the angle between the main portion and the lower portion of the blade, a supplemental portion forming part of the main blade and extending downwardly in curved form from the rear edge of the aforesaid opening, such curved portion merging into a portion substantially parallel with the lower end portion of the main blade and located below and to the rear of the straight front edge of the main blade opening and terminating in a toothed cutting edge, as and for the purpose specified.

JACOB CHRISTOPHER ADAM.

Witnesses:
   WILLIAM HENRY IRELAND, Jr.,
   JOHN SANENN.

---

Copies of this patent may be obtained for five cents each, by addressing the "Commissioner of Patents, Washington, D. C."